United States Patent
Khakhalev (10) Patent No.: US 9,882,192 B2
(45) Date of Patent: Jan. 30, 2018

(54) INTERCONNECTION ASSEMBLIES AND METHODS FOR FORMING THE INTERCONNECTION ASSEMBLIES IN A BATTERY MODULE

(71) Applicant: LG Chem, Ltd., Seoul (KR)

(72) Inventor: Alex Khakhalev, San Diego, CA (US)

(73) Assignee: LG Chem, Ltd., Seoul (KR)

( * ) Notice: Subject to any disclaimer, the term of this patent is extended or adjusted under 35 U.S.C. 154(b) by 346 days.

(21) Appl. No.: 14/503,239

(22) Filed: Sep. 30, 2014

(65) Prior Publication Data
US 2015/0017508 A1    Jan. 15, 2015

Related U.S. Application Data (62) Division of application No. 13/222,492, filed on Aug. 31, 2011, now Pat. No. 8,871,376.

(51) Int. Cl.
*H01M 2/20* (2006.01)
*H01M 2/22* (2006.01)
(Continued)

(52) U.S. Cl.
CPC ........... *H01M 2/202* (2013.01); *B23K 1/0016* (2013.01); *B23K 20/10* (2013.01); *H01M 2/204* (2013.01);
(Continued)

(58) Field of Classification Search
CPC ...... H01M 2/202; H01M 2/206; H01M 2/204; H01M 2/22; H01M 2/24; B23K 1/0016; B23K 20/10; B23K 2201/38
See application file for complete search history.

(56) References Cited

U.S. PATENT DOCUMENTS

2003/0190522 A1    10/2003 Ogata
2007/0134551 A1    6/2007 Cyr et al.
(Continued)

FOREIGN PATENT DOCUMENTS

CN    1817638 A    8/2006
CN    101558515 B    7/2011
(Continued)

OTHER PUBLICATIONS

U.S. Appl. No. 14/617,230, filed Feb. 9, 2015 entitled Battery Module and Method of Coupling First and Second Electrical Terminals of First and Second Battery Cells to a Voltage Sense Member of an Interconnect Assembly.
(Continued)

*Primary Examiner* — Eugenia Wang
(74) *Attorney, Agent, or Firm* — Buckert Patent & Trademark Law Firm PC; John F. Buckert (57) ABSTRACT

Interconnection assemblies and methods are provided. An interconnection assembly includes a first cell tab constructed of a first metal, and a second cell tab disposed against the first cell tab. The second cell tab is constructed of a second metal having a hardness greater than the first metal. The assembly further includes an interconnect member disposed against the second cell tab. The assembly further includes a weld assisting layer disposed against the first cell tab such that the first and second cell tabs are disposed between the weld assisting layer and the interconnect member.

10 Claims, 9 Drawing Sheets

(51) Int. Cl.
*H01M 2/24* (2006.01)
*B23K 20/10* (2006.01)
*B23K 1/00* (2006.01)
*B23K 101/38* (2006.01)

(52) U.S. Cl.
CPC .............. *H01M 2/206* (2013.01); *H01M 2/22* (2013.01); *H01M 2/24* (2013.01); *B23K 2201/38* (2013.01)

(56) References Cited

U.S. PATENT DOCUMENTS

| | | | |
|---|---|---|---|
| 2009/0162747 A1* | 6/2009 | Zhu | H01M 10/615 429/160 |
| 2010/0105258 A1 | 4/2010 | Koetting et al. | |
| 2010/0151312 A1 | 6/2010 | Kim et al. | |
| 2010/0190055 A1 | 7/2010 | Khakhalev | |
| 2010/0224671 A1 | 9/2010 | Scheuerman et al. | |
| 2010/0266889 A1 | 10/2010 | Kim | |
| 2011/0020694 A1 | 1/2011 | Khakhalev et al. | |
| 2013/0029206 A1* | 1/2013 | Lev | H01M 2/206 429/161 |

FOREIGN PATENT DOCUMENTS

| | | |
|---|---|---|
| JP | 2000315492 | 11/2000 |
| JP | 2006156171 | 6/2006 |
| JP | 2008123800 A | 5/2008 |
| JP | 2010282767 A | 12/2010 |
| JP | 2011204439 A | 10/2011 |
| KR | 20110119698 A | 11/2011 |
| WO | 03071616 A2 | 8/2003 |
| WO | 2011027817 A1 | 3/2011 |

OTHER PUBLICATIONS

U.S. Appl. No. 14/617,344, filed Feb. 9, 2015 entitled Battery Module and Method of Coupling First and Second Electrical Terminals of First and Second Battery Cells to First and Second Voltage Sense Members of an Interconnect Assembly.

European Search Report for European Patent Application No. 12828376.9 filed on Jun. 15, 2015.

\* cited by examiner

INTERCONNECTION ASSEMBLIES AND METHODS FOR FORMING THE INTERCONNECTION ASSEMBLIES IN A BATTERY MODULE

CROSS-REFERENCE TO RELATED APPLICATIONS

This application is a divisional of U.S. patent application Ser. No. 13/222,492 filed on Aug. 31, 2011, the entire contents of which are hereby incorporated by reference herein.

BACKGROUND

Battery modules have utilized interconnect members to electrically couple battery terminals together. However, when an interconnect member is being ultrasonically welded to a battery terminal constructed of a relatively soft metal such as aluminum, an ultrasonic welding horn may move completely through the battery terminal when attempting to weld the terminal to the interconnect member.

The inventor herein has recognized a need for an improved interconnection assembly that minimizes and/or eliminates the above-mentioned deficiency.

SUMMARY

An interconnection assembly in accordance with the exemplary embodiment is provided. The interconnection assembly includes a first cell tab of a first battery cell. The first cell tab is constructed of a first metal. The interconnection assembly further includes a second cell tab of a second battery cell. The second cell tab is disposed against the first cell tab. The second cell tab is constructed of a second metal. The second metal has a hardness greater than a hardness of the first metal. The interconnection assembly further includes an interconnect member disposed against the second cell tab. The interconnection assembly further includes a weld assisting layer disposed against the first cell tab such that the first and second cell tabs are disposed between the weld assisting layer and the interconnect member. When a welding joint is formed in the first and second cell tabs, the interconnect member, and the weld assisting layer, the weld assisting layer reduces deformation of the first cell tab.

A method of forming an interconnection assembly in a battery module in accordance with another exemplary embodiment is provided. The method includes providing a first cell tab of a first battery cell, a second cell tab of a second battery cell, an interconnect member, and a weld assisting layer. The first cell tab is constructed of a first metal, the second cell tab is constructed of a second metal. The second metal has a hardness greater than a hardness of the first metal. The method further includes disposing the second cell tab against the first cell tab. The method further includes disposing the interconnect member against the second cell tab. The method further includes disposing the weld assisting layer against the first cell tab such that the first and second cell tabs are disposed between the weld assisting layer and the interconnect member. The method further includes ultrasonically welding together the first and second cell tabs, the interconnect member, and the weld assisting layer utilizing an ultrasonic welding machine.

An interconnection assembly in accordance with another exemplary embodiment is provided. The interconnection assembly includes a first cell tab of a first battery cell. The first cell tab is constructed of a first metal. The interconnection assembly further includes a second cell tab of a second battery cell disposed against the first cell tab. The second cell tab is constructed of a second metal. The second metal has a hardness greater than a hardness of the first metal. The interconnection assembly further includes an interconnect member having a U-shaped portion and an extension portion coupled to an end of the U-shaped portion. At least a portion of the first cell tab and at least a portion of the second cell tab are disposed within an open region defined by the U-shaped portion and contacting the U-shaped portion. When a welding joint is formed in the first and second cell tabs, the interconnect member, and the U-shaped portion, the U-shaped portion reduces deformation of the first cell tab.

A method of forming an interconnection assembly in a battery module in accordance with another exemplary embodiment is provided. The method includes providing a first cell tab of a first battery cell, a second cell tab of a second battery cell, an interconnect member having a U-shaped portion and an extension portion coupled to a first end of the U-shaped portion. The first cell tab is constructed of a first metal, and the second cell tab is constructed of a second metal. The second metal has a hardness greater than a hardness of the first metal. The method further includes disposing at least a first portion of the first cell tab and at least a second portion of the second cell tab within an open region defined by the U-shaped portion of the interconnect member such that the first and second portions contact the U-shaped portion. The method further includes ultrasonically welding together the first and second cell tabs and the U-shaped portion of the interconnect member, utilizing an ultrasonic welding machine.

DETAILED DESCRIPTION

Figure 1:
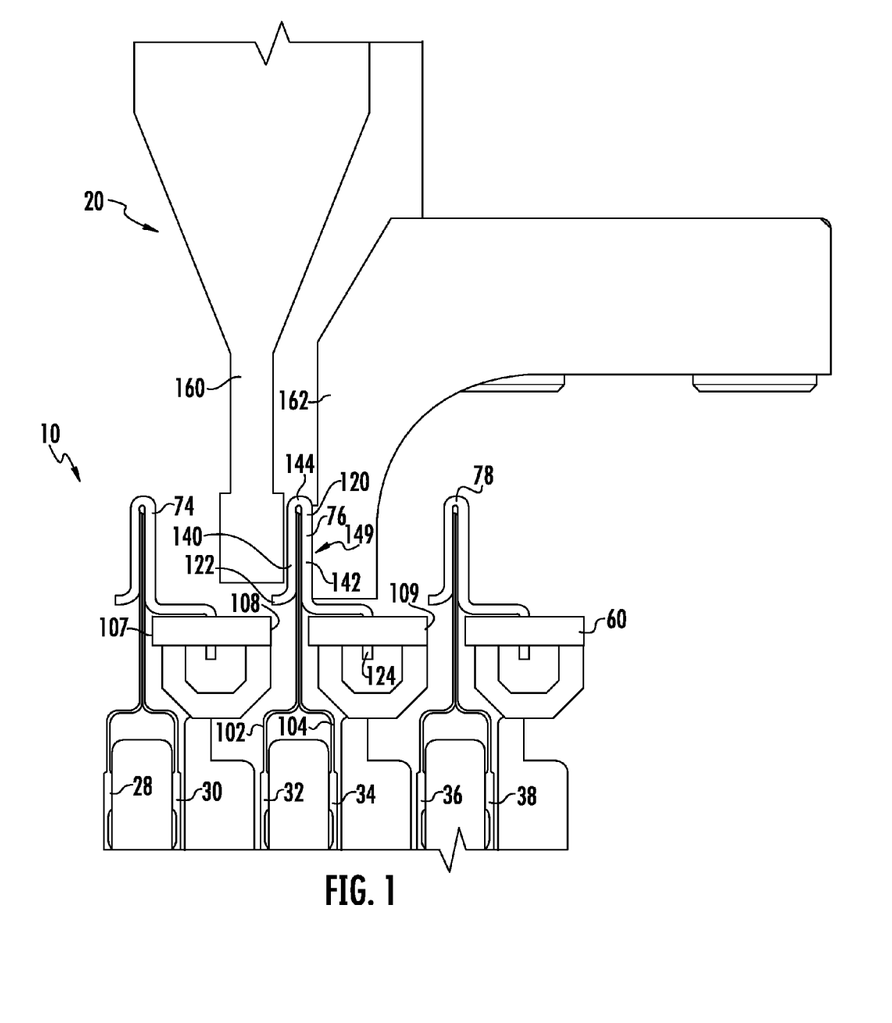
FIG. 1 is a side view of a battery module and an ultrasonic welding machine.

Referring to FIG. 1, a battery module 10 in accordance with an exemplary embodiment, and an ultrasonic welding machine 20 are illustrated. An advantage of the battery module 10 is that the module 10 utilizes improved interconnection assemblies as will be discussed in greater detail below. The battery module 10 includes battery cells 28, 30, 32, 34, 36, 38, a circuit board 60, and interconnect members 74, 76, 78. The term "metal" used herein means either a pure metal or a metal alloy.

The battery cells 28-38 have an identical structure. Each of the battery cells 28-38 have a pouch-type body (not shown) and a pair of cell tabs extending from the pouch type body. For example, the battery cell 32 has a pouch-type body and a cell tab 102 and another cell tab (not shown) extending therefrom. In one exemplary embodiment, the cell tab 102 is constructed of aluminum. Further, for example, the battery cell 34 has a pouch-type body and a cell tab 104 and another cell tab (not shown) extending therefrom. In one exemplary embodiment, the cell tab 104 is constructed of copper that has a hardness greater than a hardness of aluminum.

The circuit board 60 is disposed over the battery cells 28-38 and has apertures 107, 108, 109 extending therethrough for receiving cell tabs from the battery cells therethrough.

Referring to FIGS. 1-5, the interconnect members 74, 76, 78 are provided to be electrically coupled to cell tabs of the battery cells 28-38. The structure of the interconnect members 74-78 are identical to one another. In one exemplary embodiment, the interconnect members 74-78 are constructed of copper. Of course, in an alternative embodiment, the interconnect member 74-78 could be constructed of other metals harder than aluminum such as nickel alloys or stainless steel for example. For purposes of simplicity, the interconnect member 76 will be described in greater detail below. The interconnect member 76 includes a U-shaped portion 120, an extension portion 122, and coupling tabs 124, 126, 128, 130.

The U-shaped portion 120 defines an open region 121 for receiving the cell tabs 102, 104 therein. The U-shaped portion includes walls 140, 142 that are substantially parallel to one another, and an arcuate-shaped portion 144 coupled between the walls 140, 142. In one exemplary embodiment, a thickness of the walls 140, 142 are substantially identical to one another. In an alternative embodiment, the wall 140 has a thickness less than the thickness of the wall 142 to allow for an improved weld joint to be formed in the interconnection assembly 149.

The extension portion 122 extends from the wall 140 and is provided to direct the cell tabs 102, 104 into the open region 121 defined by the U-shaped portion 120.

The coupling tabs 124, 126, 128, 130 extend from the wall 142 of the U-shaped portion 120 and are configured to be received in respective apertures within the circuit board 60 for coupling the interconnect member 76 to the circuit board 60.

Figure 2:
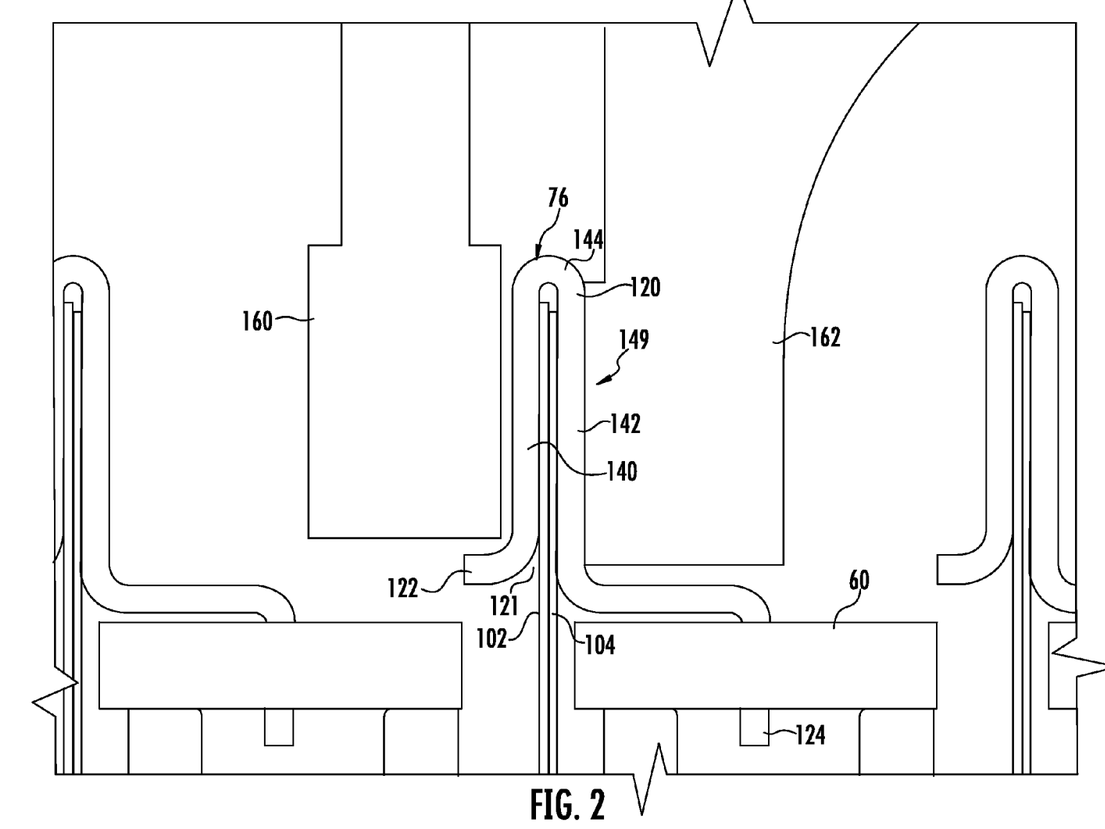
FIG. 2 is an enlarged side view of an interconnection assembly utilized within the battery module of FIG. 1 in accordance with an exemplary embodiment.
Figure 3:
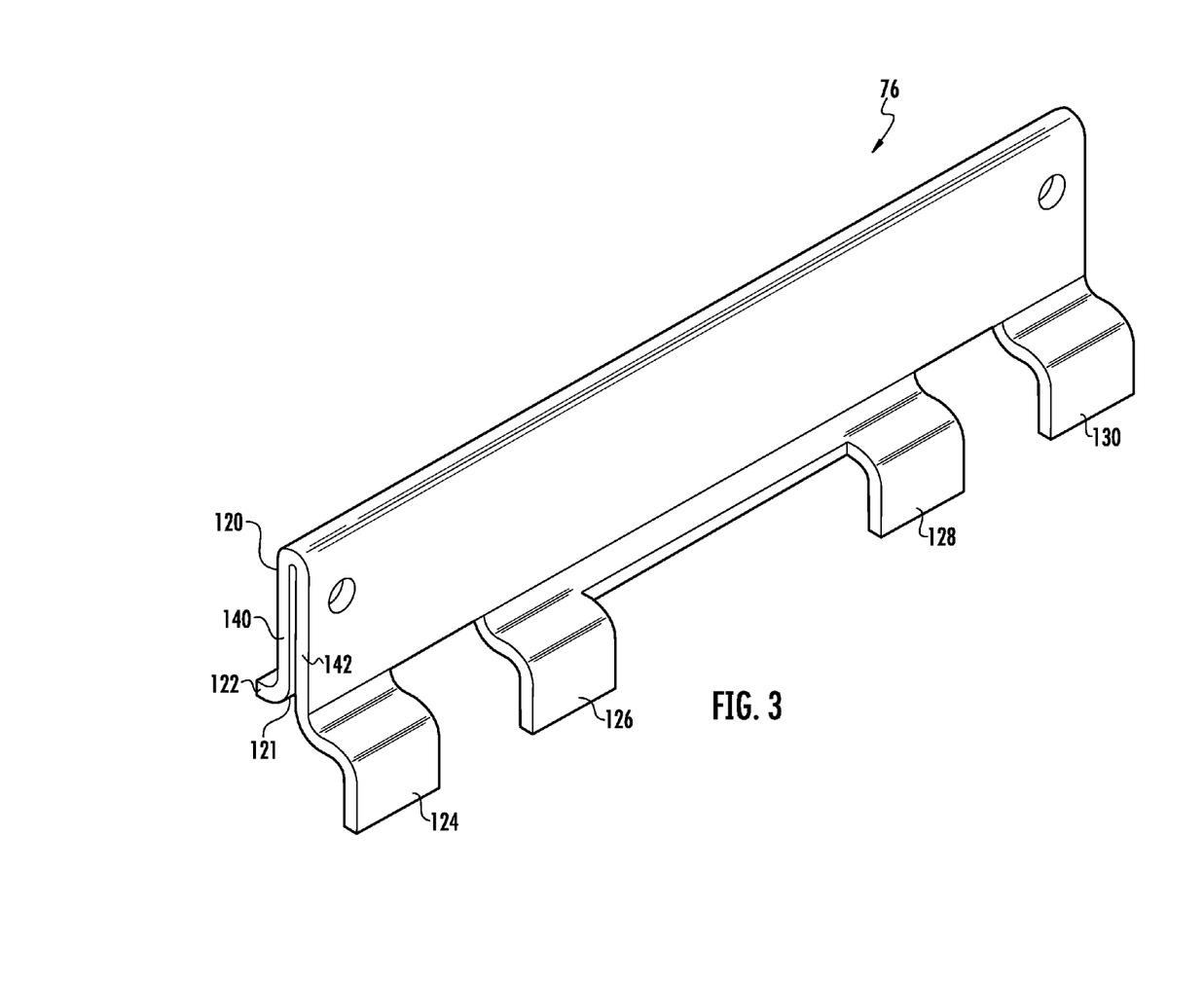
FIG. 3 is a schematic of an interconnect member utilized in the interconnection assembly of FIG. 2.
Figure 4:
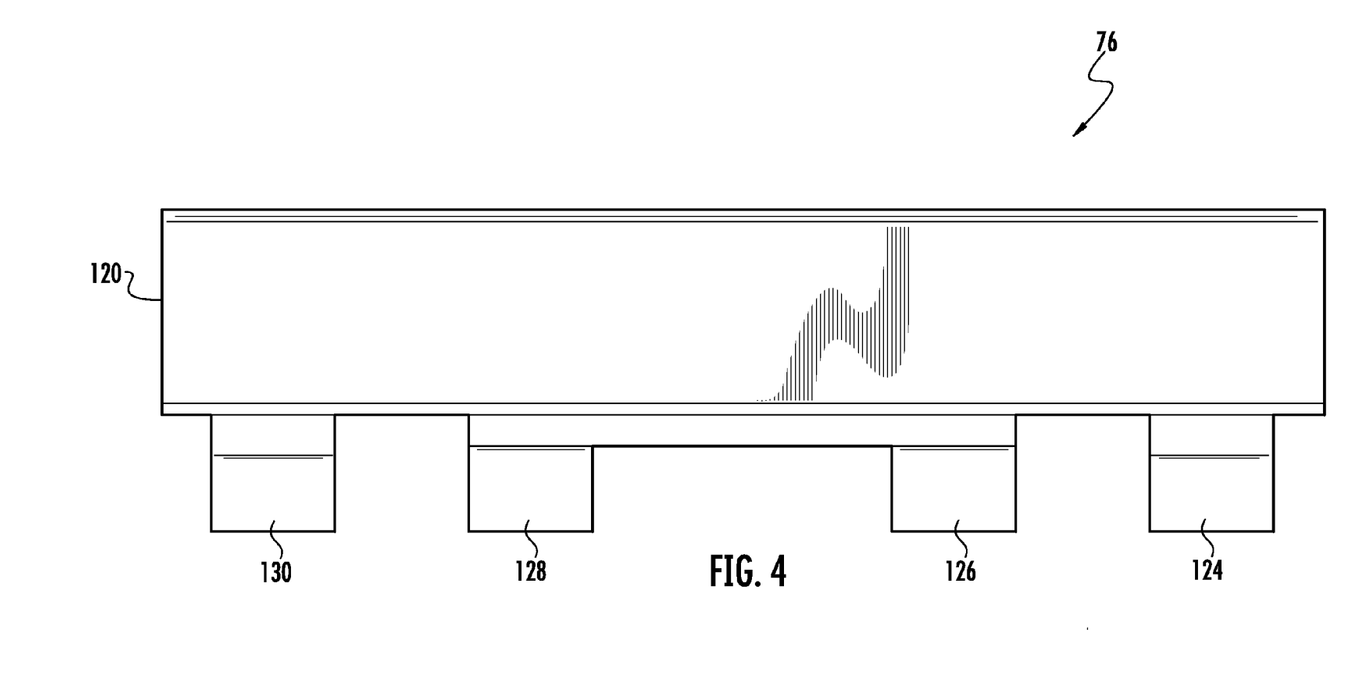
FIG. 4 is a rear view of the interconnect member of FIG. 3.
Figure 5:
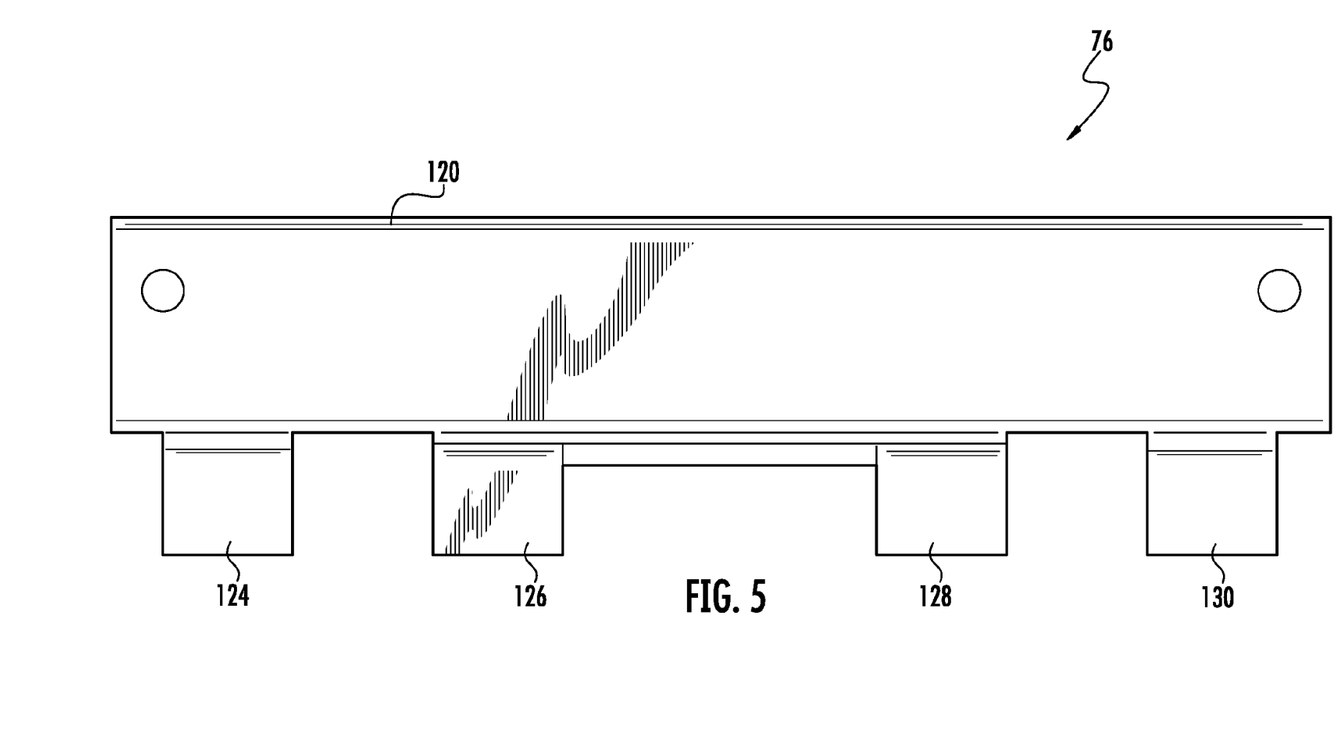
FIG. 5 is a front view of the interconnect member of FIG. 3.

When the interconnect member 76 is welded to the cell tabs 102, 104 by the ultrasonic welding machine 20, the interconnect member 76 and the cell tabs 102, 104 comprise an interconnection assembly 149. An advantage of the interconnection assembly 149 is that the assembly may utilize the wall 140 constructed of copper or another metal (e.g., nickel alloys or stainless steel) harder than aluminum to protect the aluminum cell tab 102 during ultrasonic welding such that an ultrasonic welding horn 160 does not penetrate through the aluminum cell tab 102 before forming a weld joint within the wall 140, the cell tabs 102, 104, and the wall 142.

Referring to FIG. 1, the ultrasonic welding machine 20 includes the ultrasonic welding horn 160 and the anvil 162. During ultrasonic welding of the interconnect member 76 to the cell tabs 102, 104, the ultrasonic welding horn 160 contacts the wall 140 of the interconnect member 76, and the anvil 162 contacts the wall 142 of the interconnect member 76.

Figure 6:
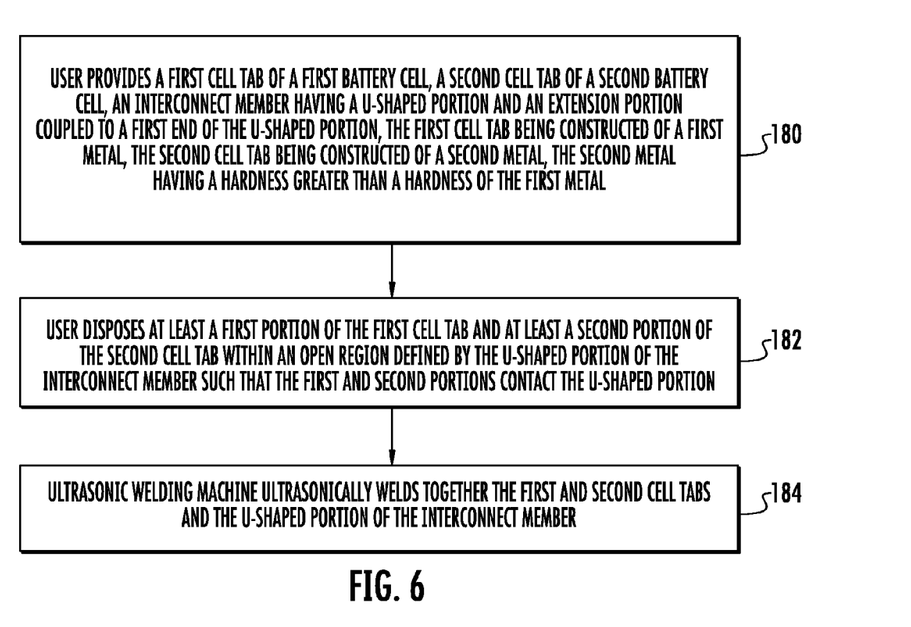
FIG. 6 is a flowchart of a method for forming the interconnection assembly of FIG. 2 in accordance with another exemplary embodiment.

Referring to FIG. 6, a flowchart of a method for forming the interconnection assembly 149 in accordance with another exemplary embodiment will be explained.

At step 180, a user provides the cell tab 102 of the battery cell 132, the cell tab 104 of the battery cell 34, and the interconnect member 76. The interconnect member 76 has the U-shaped portion 120 and an extension portion 122 coupled to a first end of the U-shaped portion 120. The cell tab 102 is constructed of a first metal (e.g., aluminum), and the cell tab 104 is constructed of a second metal (e.g., copper). The second metal has a hardness greater than a hardness of the first metal.

At step 182, the user disposes at least a first portion of the cell tab 102 and at least a second portion of cell tab 104 within the open region 121 defined by the U-shaped portion 120 of the interconnect member 76 such that the first and second portions contact the U-shaped portion 120.

At step 184, the ultrasonic welding machine 20 ultrasonically welds together the cell tabs 102, 104 and the U-shaped portion 120 of the interconnect member 76.

Figure 7:
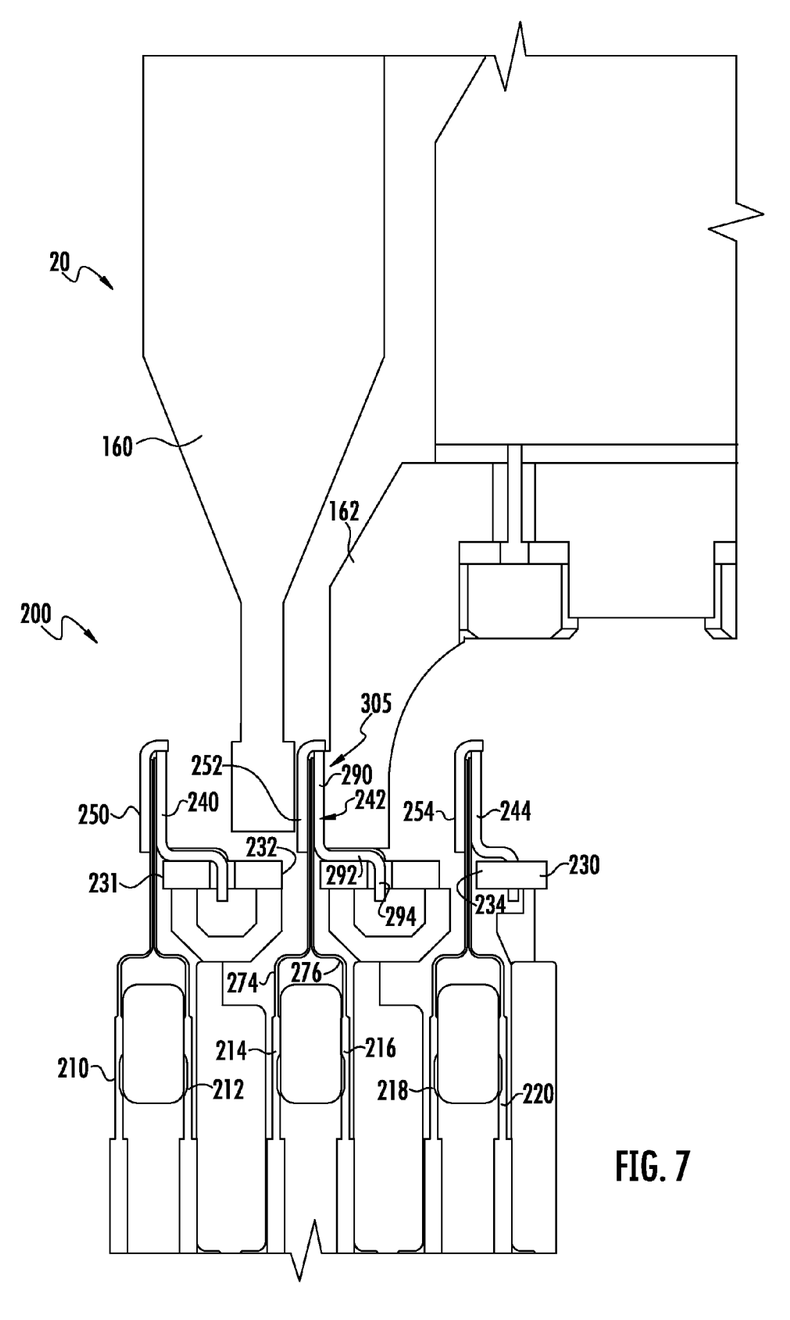
FIG. 7 is a side view of another battery module having other interconnection assemblies and an ultrasonic welding machine.
Figure 8:
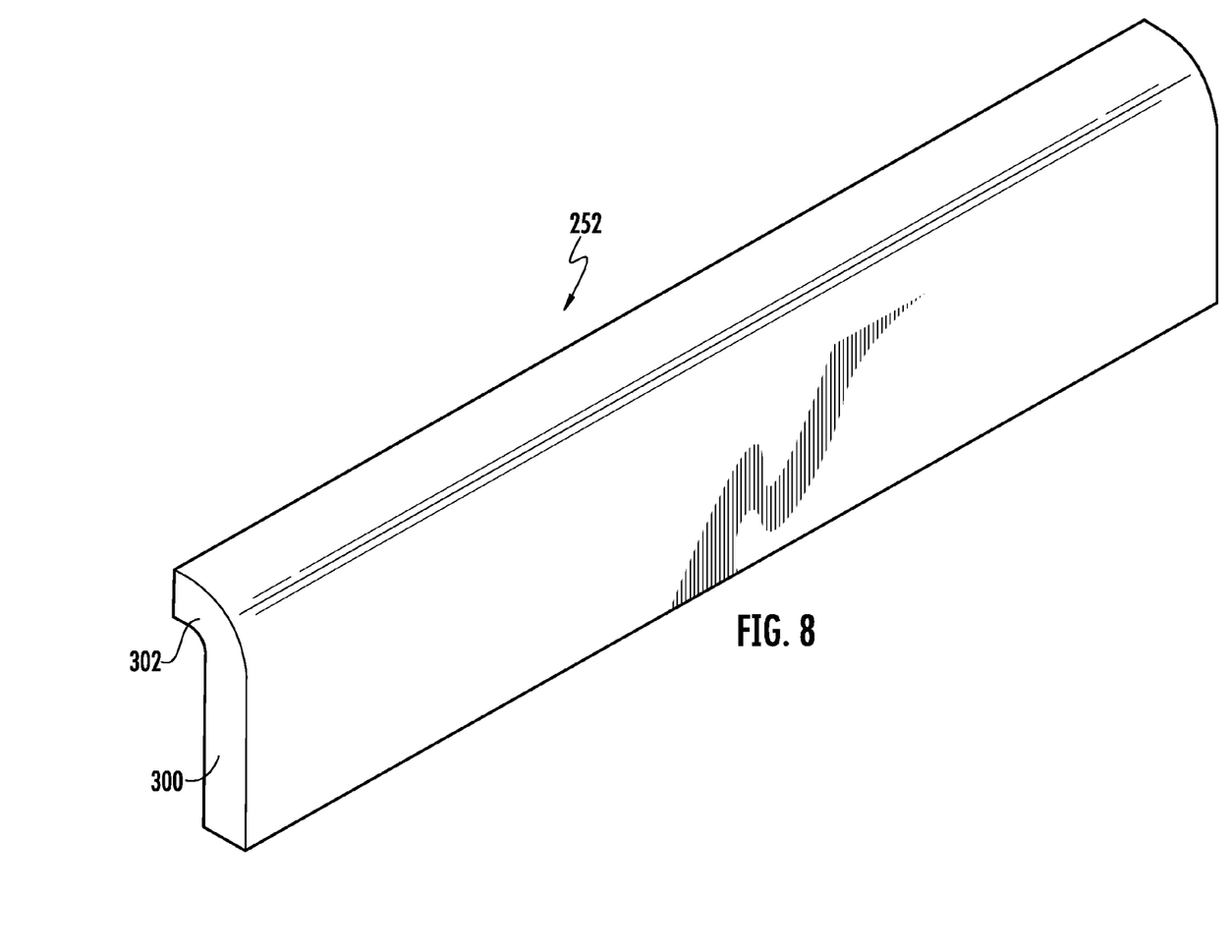
FIG. 8 is an enlarged side view of a weld assisting layer utilized within the battery module of FIG. 7 in accordance with another exemplary embodiment.

Referring to FIGS. 7 and 8, a battery module 200 in accordance with another exemplary embodiment, and an ultrasonic welding machine 20 are illustrated. An advantage of the battery module 200 is that the module 200 utilizes improved interconnection assemblies as will be discussed in greater detail below. The battery module 10 includes battery cells 210, 212, 214, 216, 218, 220, a circuit board 230, interconnect members 240, 242, 244, and weld assisting layers 250, 252, 254.

The battery cells 210-220 have an identical structure. Each of the battery cells 210-220 have a pouch-type body (not shown) and a pair of cell tabs extending from the pouch type body. For example, the battery cell 214 has a pouch-type body (not shown) and a cell tab 274 and another cell tab (not shown) extending therefrom. In one exemplary embodiment, the cell tab 274 is constructed of aluminum. Further, for example, the battery cell 216 has a pouch-type body (not shown) and a cell tab 276 and another cell tab (not shown) extending therefrom. In one exemplary embodiment, the cell tab 276 is constructed of copper that has a hardness greater than a hardness of aluminum.

The circuit board 230 is disposed over the battery cells 210-220 and has apertures 231, 232, 234 extending therethrough for receiving cell tabs from the battery cells therethrough.

The interconnect members 240, 242, 244 are provided to be electrically coupled to cell tabs of the battery cells 210-220. The structure of the interconnect members 240-244 are identical to one another. In one exemplary embodiment, the interconnect members 240-244 are constructed of copper. Of course, in an alternative embodiment, the interconnect members 240-244 could be constructed of other metals (e.g., nickel alloys or stainless steel) that are harder than aluminum. For purposes of simplicity, the interconnect member 242 will be described in greater detail below. The interconnect member 242 includes walls 290, 292, and a coupling tab 294 and other coupling tabs (not shown). The wall 292 extends from an end of the wall 290 and is disposed substantially perpendicular to the wall 290. The coupling tab 294 extends from an end of the wall 292 and is disposed substantially perpendicular to the wall 292. The coupling tab 294 and the other coupling tabs (not shown) are configured to couple the interconnect member 242 to the circuit board 230.

The weld assisting layers 250-254 are provided to be disposed adjacent to aluminum cell tabs to prevent the ultrasonic welding horn 160 from forming holes in the aluminum cell tabs during formation of a weld joint in the weld assisting layer 252, the cell tabs 274, 276, and the interconnect member 242. The weld assisting layer 252 includes a flat wall portion 300 and an arcuate-shaped portion 302 that extends from an end of the flat wall portion 300. The flat wall portion 300 is disposed adjacent to the cell tab 274 and the arcuate-shaped portion extends over top ends of the cell tabs 274, 276. In one exemplary embodiment, a thickness of each of the weld assisting layers 250-254 is substantially equal to a thickness of the wall 290 of the interconnect member 242. In an alternative embodiment, a thickness of each of the weld assisting layers 250-254 is less than a thickness of the wall 290 of the interconnect member 242 to allow for an improved weld in the interconnection assembly 305.

When the weld assisting layer 252 and the interconnect member 242 is welded to the cell tabs 274, 276 by the ultrasonic welding machine 20, the weld assisting layer 252, the cell tabs 74, 276, and the interconnect member 242 comprise an interconnection assembly 305. An advantage of the interconnection assembly 305 is that the assembly utilizes the weld assisting layer 252 to protect the aluminum cell tab 274 during ultrasonic welding such that the ultrasonic welding horn 160 does not penetrate through the aluminum cell tab 274 before forming a weld joint within the weld assisting layer 252, the cell tabs 274, 276, and the interconnect member 242.

Figure 9:
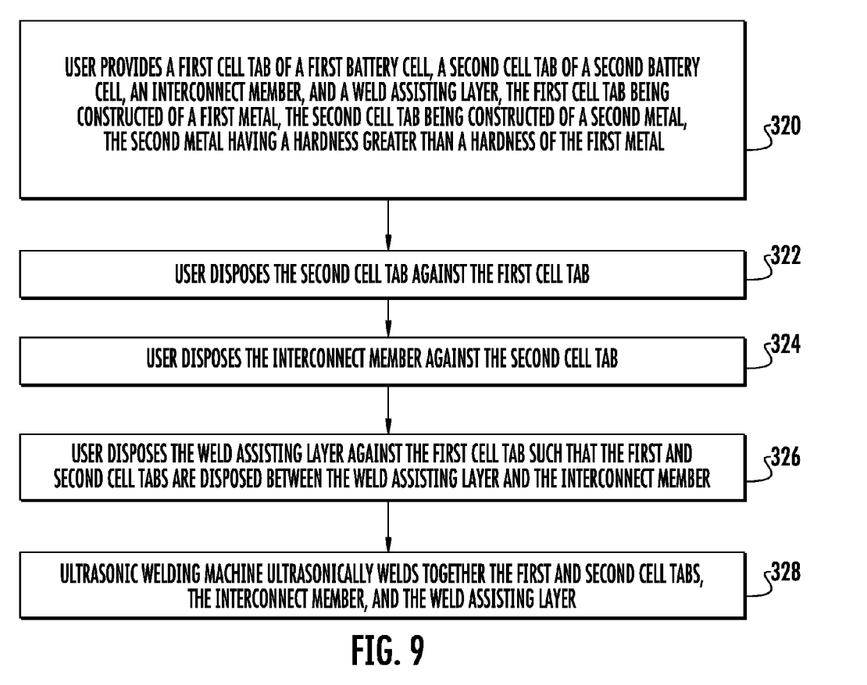
FIG. 9 is a flowchart of a method for forming an interconnection assembly utilizing the weld assisting layer of FIG. 8 in accordance with another exemplary embodiment.

Referring to FIG. 9, a flowchart of a method for forming the interconnection assembly 305 in accordance with another exemplary embodiment will be explained.

At step 320, a user provides the cell tab 274 of the battery cell 214, the cell tab 276 of the battery cell 216, the interconnect member 242, and the weld assisting layer 252. The cell tab 274 is constructed of a first metal (e.g., aluminum), the cell tab 276 is constructed of a second metal (e.g., copper). The second metal has a hardness greater than a hardness of the first metal.

At step 322, the user disposes the cell tab 276 against the cell tab 274.

At step 324, the user disposes the interconnect member 242 against the cell tab 276.

At step 326, the user disposes the weld assisting layer 252 against the cell tab 274 such that the cell tabs 274, 276 are disposed between the weld assisting layer 252 and the interconnect member 242.

At step 328, the ultrasonic welding machine 20 ultrasonically welds together the cell tabs 274, 276, the interconnect member 242, and the weld assisting layer 252.

The interconnection assemblies and the methods of forming the interconnection assemblies described herein provide a substantial advantage over other assemblies and methods. In particular, the interconnection assemblies and methods provide a technical effect of utilizing either an interconnect member or a weld assisting layer to prevent an ultrasonic welding horn from forming holes in a cell tab constructed of a relatively soft metal such as aluminum.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

I claim:

1. An interconnection assembly, comprising:
   a first cell tab of a first battery cell, the first cell tab being constructed of a first metal;
   a second cell tab of a second battery cell being disposed directly on and against the first cell tab, the second cell tab being constructed of a second metal, the second metal having a hardness greater than a hardness of the first metal;
   an interconnect member having a U-shaped metal portion and a metal extension portion, the U-shaped metal portion having first and second wall portions extending in a first direction parallel to one another and opposed to one another that have an open region therebetween, a first portion of the first cell tab and a first portion of the second cell tab being disposed within the open region and directly contacting each other within the open region, the first portion of the first cell tab directly contacting the first wall portion of the U-shaped metal portion in the open region, the first portion of the second cell tab directly contacting the second wall portion of the U-shaped metal portion in the open region, the metal extension portion having a first arcuate-shaped wall portion that is directly coupled to and extending outwardly from a first end of the first wall portion of the U-shaped metal portion and away from the first and second cell tabs such that the metal extension portion directs the first and second cell tabs into the open region; and when a welding joint is formed in the first and second cell tabs, the interconnect member, and the U-shaped metal portion, the U-shaped metal portion reduces deformation of the first cell tab;
   a first coupling tab being directly coupled to and extending outwardly from an end of the second wall portion of the U-shaped metal portion;
   a second coupling tab being directly coupled to and extending outwardly from the end of the second wall portion of the U-shaped metal portion; and
   a third coupling tab being directly coupled to and extending outwardly from the end of the second wall portion of the U-shaped metal portion.

2. The interconnection assembly of claim 1, wherein the first metal is aluminum.

3. The interconnection assembly of claim 2, wherein the second metal is copper.

4. The interconnection assembly of claim 1, wherein the U-shaped metal portion and the metal extension portion of the interconnect member is constructed of either the second metal or a third metal.

5. The interconnection assembly of claim 1, wherein:
   the U-shaped metal portion further having a second arcuate-shaped wall portion directly coupled to and between the first and second wall portions of the U-shaped metal portion.

6. The interconnection assembly of claim 1, wherein the first arcuate-shaped wall portion of the metal extension portion has a non-contacting relationship with the first and second cell tabs.

7. The interconnection assembly of claim 1, wherein each of the first, second, and third coupling tabs are an L-shaped coupling tab.

8. An interconnection assembly, comprising:
a first cell tab of a first battery cell, the first cell tab being constructed of a first metal;
a second cell tab of a second battery cell being disposed directly on and against the first cell tab, the second cell tab being constructed of a second metal, the second metal having a hardness greater than a hardness of the first metal;
an interconnect member having a U-shaped metal portion, a metal extension portion, and first and second coupling tabs; the U-shaped metal portion having a first arcuate-shaped wall portion and first and second wall portions being directly coupled to first and second ends, respectively, of the first arcuate-shaped wall portion; the first and second wall portions extending in a first direction parallel to one another, the first and second wall portions having an open region therebetween;
a first portion of the first cell tab and a first portion of the second cell tab being disposed within the open region and directly contacting each other within the open region;
the first portion of the first cell tab directly contacting a first inner surface portion of the first wall portion in the open region,
the first portion of the second cell tab directly contacting a second inner surface portion of the second wall portion in the open region;
the metal extension portion having a second arcuate-shaped wall portion being directly coupled to and extending outwardly from an end of the first wall portion of the U-shaped metal portion in a second direction away from the first and second cell tabs such that the metal extension portion directs the first and second cell tabs into the open region; and when a welding joint is formed in the first and second cell tabs, the interconnect member, and the U-shaped metal portion, the U-shaped metal portion reduces deformation of the first cell tab;
the first coupling tab being directly coupled to and extending outwardly from an end of the second wall portion of the U-shaped metal portion; and
the second coupling tab being directly coupled to and extending outwardly from the end of the second wall portion of the U-shaped metal portion.

9. The interconnection assembly of claim 8, wherein each of the first and second coupling tabs are an L-shaped coupling tab.

10. The interconnection assembly of claim 8, wherein the second arcuate-shaped wall portion of the metal extension portion has a non-contacting relationship with the first and second cell tabs.

* * * * *